(12) United States Patent
Kishimoto et al.

(10) Patent No.: US 11,649,380 B2
(45) Date of Patent: May 16, 2023

(54) WATER-DISPERSIBLE SHEET

(71) Applicants: NIPPON PAPER PAPYLIA CO., LTD., Shizuoka (JP); Nippon Paper Industries Co., Ltd., Tokyo (JP)

(72) Inventors: Masaki Kishimoto, Tokyo (JP); Yoshiaki Ishino, Tokyo (JP); Yasuaki Matsumori, Tokyo (JP); Eiji Kusano, Tokyo (JP); Kento Aoshima, Tokyo (JP); Kazuyo Wadagami, Tokyo (JP); Kumiko Katsumata, Tokyo (JP)

(73) Assignees: NIPPON PAPER PAPYLIA CO., LTD., Shizuoka (JP); Nippon Paper Industries Co., Ltd., Tokyo (JP)

( * ) Notice: Subject to any disclaimer, the term of this patent is extended or adjusted under 35 U.S.C. 154(b) by 322 days.

(21) Appl. No.: 16/644,732

(22) PCT Filed: Aug. 15, 2018

(86) PCT No.: PCT/JP2018/030336
§ 371 (c)(1),
(2) Date: Mar. 5, 2020

(87) PCT Pub. No.: WO2019/049619
PCT Pub. Date: Mar. 14, 2019

(65) Prior Publication Data
US 2020/0231844 A1    Jul. 23, 2020

(30) Foreign Application Priority Data

Sep. 5, 2017   (JP) .............................. JP2017-169947

(51) Int. Cl.
*C09J 7/21* (2018.01)
*D21H 11/02* (2006.01)
(Continued)

(52) U.S. Cl.
CPC ................ *C09J 7/21* (2018.01); *B41M 5/502* (2013.01); *D21H 11/02* (2013.01); *D21H 19/42* (2013.01);
(Continued)

(58) Field of Classification Search
CPC ........ D21H 11/02; D21H 19/42; D21H 19/72; D21H 19/828; D21H 27/00; D21H 27/30;
(Continued)

(56) References Cited

U.S. PATENT DOCUMENTS 3,839,144 A     10/1974  Lounden
8,877,678 B2 *  11/2014  Koyama ................ D21H 11/20
                                                503/200

(Continued)

FOREIGN PATENT DOCUMENTS

CN      102459757 A    5/2012
EP       1705288 A2    9/2006
(Continued)

OTHER PUBLICATIONS

English translation of International Search Report corresponding to International Application No. PCT/JP2018/030336 dated Oct. 16, 2018.

(Continued)

*Primary Examiner* — Jose A Fortuna
(74) *Attorney, Agent, or Firm* — Jenkins, Wilson, Taylor & Hunt, P.A.

(57) ABSTRACT

A water-dispersible sheet is described that maintains water dispersibility while providing suppressed time degradation of the tacky adhesiveness of a tacky adhesive layer. The water-dispersible sheet has a paper substrate with a multilayer structure. One layer of the multilayer structure is an inner layer that is not in contact with the tacky adhesive layer. Another layer is a surface layer that is in contact with (Continued)

— Thermosensitive recording layer

— Second surface layer

— Inner layer

— First surface layer

— Tacky adhesive layer the tacky adhesive layer. The layers independently include mixed pulps of a wood pulp and a refined pulp with an α-cellulose content of 88 % by weight or more. The weight ratio of the layers and the beating degree of the mixed pulps are set in the specific ranges.

18 Claims, 1 Drawing Sheet (51) Int. Cl.
    *D21H 19/42*     (2006.01)
    *D21H 19/72*     (2006.01)
    *D21H 27/00*     (2006.01)
    *D21H 27/30*     (2006.01)
    *B41M 5/50*     (2006.01)
    *D21H 19/82*     (2006.01)

(52) U.S. Cl.
    CPC ........... *D21H 19/72* (2013.01); *D21H 19/828* (2013.01); *D21H 27/00* (2013.01); *D21H 27/30* (2013.01); *C09J 2400/283* (2013.01)

(58) Field of Classification Search
    CPC .. D21H 19/00; D21H 27/10; C09J 7/21; C09J 2400/283; C09J 201/00; B41M 5/502; B41M 5/50; B41M 5/41
    See application file for complete search history.

(56) References Cited

U.S. PATENT DOCUMENTS

| | | | | |
|---|---|---|---|---|
| 9,388,532 | B2* | 7/2016 | Koyama | ................ B41M 5/508 |
| 10,323,354 | B2* | 6/2019 | Kawahara | .............. D21H 11/18 |
| 11,078,625 | B2* | 8/2021 | Kishimoto | ........... D21H 27/005 |
| 2005/0123753 | A1 | 6/2005 | Trochlil | |
| 2006/0216537 | A1 | 9/2006 | Natsui et al. | |
| 2012/0080155 | A1 | 4/2012 | Konishi et al. | |
| 2014/0338851 | A1* | 11/2014 | Koyama | ................ G09F 3/0291 |
| | | | | 162/157.6 |
| 2016/0177512 | A1* | 6/2016 | Kawahara | .............. D21H 17/08 |
| | | | | 162/158 |
| 2019/0257032 | A1* | 8/2019 | Kawahara | .............. D21H 19/34 |
| 2019/0270328 | A1* | 9/2019 | Kishimoto | ............. D21H 27/30 |
| 2020/0040530 | A1* | 2/2020 | Kishimoto | ............. D21H 13/04 |
| 2020/0095470 | A1* | 3/2020 | Kishimoto | ................. C09J 7/21 |
| 2020/0231844 | A1* | 7/2020 | Kishimoto | ............. D21H 27/30 |
| 2020/0308453 | A1* | 10/2020 | Kishimoto | ................ C09J 7/21 |
| 2022/0127497 | A1* | 4/2022 | Ishino | .................... D21H 19/84 |

FOREIGN PATENT DOCUMENTS

| | | | |
|---|---|---|---|
| EP | 2 120 228 | A2 | 11/2009 |
| EP | 2441869 | A1 | 4/2012 |
| EP | 2599914 | A1 | 6/2013 |
| JP | 63-81036 | A | 4/1988 |
| JP | 10-310960 | A | 11/1998 |
| JP | 2000-170100 | A | 6/2000 |
| JP | 2004 314623 | A | 11/2004 |
| JP | 2006-299498 | A | 11/2006 |
| JP | 2007 237634 | A | 9/2007 |
| JP | 2008-297668 | A | 12/2008 |
| JP | 2012 061612 | A | 3/2012 |
| JP | 2014185407 | A * | 10/2014 |
| JP | 2015-163742 | A | 9/2015 |
| JP | 2016-53235 | A | 4/2016 |
| JP | 2018-104860 | A | 7/2018 |
| WO | WO 2010/143736 | A1 | 12/2010 |
| WO | WO 2012/014970 | A1 | 2/2012 |
| WO | WO 2018/088179 | A1 | 5/2018 |
| WO | WO-2018088179 | A1 * | 5/2018 .............. B41M 5/41 |

OTHER PUBLICATIONS

Supplementary European Search Report corresponding to EP Application No. 18 85 4637 dated Jul. 14, 2020.

* cited by examiner

WATER-DISPERSIBLE SHEET

FIELD OF THE INVENTION

The present invention relates to a water-dispersible sheet comprising a tacky adhesive layer on one side and a coating layer, such as a thermosensitive recording layer and an inkjet recording layer, on the other side.

BACKGROUND OF THE INVENTION

Water-dispersible paper (also referred to as Water-disintegrable paper or Water-soluble paper) which is rapidly dispersed in water is widely used for applications such as filter-wrapping paper of cigarettes, confidential document paper, water-dispersible label (Reference 1 etc.). Among these, the water-dispersible label has a structure in which a coating layer such as a thermosensitive recording layer or an inkjet recording layer is installed on a surface of the water-dispersible paper so that printing can be performed on the surface and a water-soluble tacky adhesive layer is installed on the back surface. And these are used by adhering these to returnable containers etc. (Reference 2 etc.).

In addition, water-dispersible papers with a multilayer structure have been developed in order to add various capabilities for various applications while maintaining the water dispersibility (References 3 and 4, etc.). For example, a water-dispersible paper has a multilayer structure comprising alkalized fibrous carboxymethyl cellulose and paper-making water-dispersible fibers in order to improve the printing/print suitability thereof, when applying a pigment coating layer or a thermosensitive recording layer on water-dispersible paper (Reference 3), or a water-dispersible paper has a multilayer structure with a reduced amount of paper adhesive (for example, fibrous carboxyalkyl cellulose salt) in the layer in contact with the dryer in order to smoothly perform the papermaking (Reference 4).

In addition, a water-dispersed paper with a paper surface pH of 6 to 8 (neutral region) is disclosed, which shows a rapid water dispersibility and a high strength (i.e. good printability) by adding a water-soluble polymer to the paper substrate, which comprises a wood pulp and a refined pulp with α-cellulose content of 88% by weight or more (Reference 5).

Reference 1: Japanese Patent Application Public Disclosure H09-49188
Reference 2: Japanese Patent Application Public Disclosure 2004-314623
Reference 3: Japanese Patent Application Public Disclosure 2006-299498
Reference 4: Japanese Patent Application Public Disclosure H04-370300
Reference 5: International Publication WO2012/014970

PROBLEMS TO BE SOLVED BY THE INVENTION

The present invention provides a water-dispersible sheet having a paper surface pH of 6 to 8 (neutral region) in impart a good printability and the like to the water-dispersible sheet. However, a water-dispersible material comprising conventional wood pulp and refined pulp with α-cellulose content of 88% by weight or more (such as Reference 5) could not suppress the time-dependent deterioration of the tacky adhesiveness of the tacky adhesive layer while maintaining the water-dispersibility (see Comparative Examples 7, 8 etc.), although it could provide the paper surface pH of 6 to 8 (neutral region).

Therefore, it is the objective of the present invention to provide a water-dispersible sheet with a suppressed time degradation of the tacky adhesiveness of the tacky adhesive layer, while maintaining the water dispersibility.

MEANS TO SOLVE THE PROBLEMS

As a result of intensive studies of the above problems, the preset inventors have found that the time degradation of the tacky adhesiveness of the tacky adhesive layer of a water-dispersible sheet can be suppressed, while maintaining the water dispersibility, by using a paper substrate of the water-dispersible sheet with a multilayer structure, wherein one of the multilayer (inner layer) which is not in contact with a tacky adhesive layer and the other layer (surface layer) which is in contact with the tacky adhesive layer comprise independently mixed pulps of a wood pulp (for example, an unrefined pulp) and a refined pulp with α-cellulose content of 88% by weight or more, wherein the weight ratio of these layers and the beating degree of the mixed pulps are set in the specific ranges.

That is, the present invention provides a water-dispersible sheet comprising a paper substrate comprising an inner layer and at least one surface layer, wherein a tacky adhesive layer is installed on one of the surface layer (hereinafter referred to as "first surface layer"), wherein the first surface layer comprises a mixed pulp 1, which comprises a wood pulp and a refined pulp with α-cellulose content of 88% by weight or more, wherein the Canadian standard freeness of the mixed pulp 1 is from 450 to 600 ml CSF, the content of the wood pulp in the mixed pulp 1 is from 50 to 95% by weight, the inner layer comprises a mixed pulp 3, which comprises a wood pulp and a refined pulp with α-cellulose content of 88% by weight or more, wherein the Canadian standard freeness of the mixed pulp 3 is from 600 to 750 ml CSF, and the content of the wood pulp in the mixed pulp 3 is from 50 to 95% by weight.

Also the present invention provides a paper substrate comprising an inner layer and two surface layers installed on both sides of the inner layer, wherein each of the two surface layers independently comprises a mixed pulp, which comprises a wood pulp and a refined pulp with α-cellulose content of 88% by weight or more, wherein the Canadian standard freeness of the mixed pulp is from 450 to 600 ml CSF, the content of the wood pulp in the mixed pulp is from 50 to 95% by weight, the inner layer comprises a mixed pulp 3, which comprises a wood pulp and a refined pulp with α-cellulose content of 88% by weight or more, wherein the Canadian standard freeness of the mixed pulp 3 is from 600 to 750 ml CSF, and the content of the wood pulp in the mixed pulp 3 is from 50 to 95% by weight.

Furthermore, the present invention provides a method for preparing a water-dispersible sheet comprising steps (1) and (2):
(1) providing a paper substrate comprising an inner layer and two surface layers, which are first surface layer and second surface layer, installed on both sides of the inner layer, wherein each of the two surface layers independently comprises a mixed pulp, which comprises a wood pulp and a refined pulp with α-cellulose content of 88% by weight or more, wherein the Canadian standard freeness of the mixed pulp is from 450 to 600 ml CSF, the content of the wood pulp in the mixed pulp is from 50 to 95% by weight, the inner layer comprises a mixed pulp 3, which comprises a wood pulp and a refined pulp with α-cellulose content of 88% by weight or more, wherein the Canadian standard freeness of the mixed pulp 3 is from 600 to 750 ml CSF, and the content of the wood pulp in the mixed pulp 3 is from 50 to 95% by weight, and (2) installing a tacky adhesive layer on the first surface layer.

The method may further comprise, between the steps (1) and (2), a step of (3) applying an aqueous coating material on the second surface layer, or a step of (3) installing a thermosensitive recording layer or an inkjet recording layer on the second surface layer.

ADVANTAGES OF THE INVENTION

According to the present invention, the tacky adhesive strength retention of the tacky adhesive layer can be improved, while maintaining the water dispersibility and/or water solubility, by using a sheet (i.e. paper substrate) used for a water-dispersible sheet with a multilayer structure, wherein both the inner layer and the surface layer comprise mixed pulps of a wood pulp (for example, an unrefined pulp) and a refined pulp, wherein the ratio of these and the beating degree of the mixed pulps are set in the specific ranges.

DETAILED DESCRIPTION OF THE INVENTION

Figure 1:
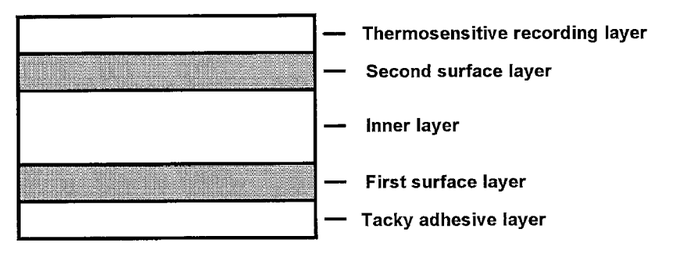
FIG. 1 shows the configuration of the water-dispersible sheet of the present invention. Among these, the inner layer, the first surface layer and the tacky adhesive layer are essential elements of the water-dispersible sheet of the present invention, but the second surface layer and the thermosensitive recording layer are optional elements of the water-dispersible sheet of the present invention.

The water-dispersible sheet of the present invention comprises a paper substrate (hereinafter also referred to as "base paper") and a tacky adhesive layer, and this base paper comprises an inner layer and at least one surface layer. The water-dispersible paper has a tacky adhesive layer on one surface layer of this base paper (hereinafter also referred to as "first surface layer"). This water-dispersible paper may have a second surface layer on the other side of the inner layer, that is, opposite to the first surface layer. The configuration of the water-dispersible sheet of the present invention is shown in FIG. 1.

Both of the inner layer and the surface layer (which may comprise first surface layer and second surface layer) comprise a mixed pulp comprising a wood pulp and a refined pulp with α-cellulose content of 88% by weight or more (hereinafter also referred to as just "refined pulp").

Wood pulp fiber or non-wood type pulp fiber generally used for papermaking can be used as the wood pulp, and the α-cellulose content is less than 88% by weight. The wood pulp includes, for example, wood pulp fibers such as softwood kraft pulp, hardwood kraft pulp and the like, and non-wood pulp fibers such as flax pulp, Manila hemp pulp and kenaf pulp and the like. The average fiber length of the wood pulp is 0.1 to 5 mm, preferably 0.5 to 3 mm, more preferably 0.8 to 2 mm.

The refined pulp refers to a pulp in which hemicellulose and the like are removed by strengthening the digestion condition during pulp production and/or by chemical treatment before or after digestion to increase the cellulose purity to be purified to the α-cellulose content of 88% by weight or more, such as mercerized pulp or dissolved pulp made from wood such as softwood or hardwood or non-wood such as flax or linter.

Regarding the relationship between the α-cellulose content and the hemicellulose content of pulp, Japanese Patent Application Public Disclosure No. 2010-504376 discloses that a pulp is divided into three grades depending on the degree of refining, that is, "acetate grade" which is a highly refined pulp, "viscose grade" which is a normally refined pulp, and "paper/fluff grade" which is an unrefined pulp, and the content of each grade is described in the gazette. The α-cellulose content and the hemicellulose content of "acetate grade" are 95% by weight or more and about 1 to 3%, respectively. The α-cellulose content and the hemicellulose content of "viscose grade" are 88 to 95% by weight and about 5 to 12%, respectively. The α-cellulose content and the hemicellulose content of "paper/fluff grade" are 80 to 88% by weight and about 12 to 20%, respectively.

From the above, the hemicellulose content in the refined pulp used in the present invention is less than 12% by weight.

In the present invention, "pulp" is generally defined as "an aggregate of cellulose fibers extracted from wood or other plants by mechanical or chemical treatment" (see Paper Pulp Dictionary, edited by Paper Pulp Association, published by Kanehara Publishing, Feb. 20, 2000).

Mercerized pulp refers to a pulp obtained by immersing kraft pulp or sulfite pulp in a strong alkaline solution, and then washed with water to remove alkali components.

Dissolved pulp refers to a pulp with high cellulose purity obtained by sulfite digestion or pre-hydrolysis kraft digestion, and pulp with various cellulose purity can be obtained by combining bleaching and selective treatment after digestion.

The reason why superior dispersibility can be obtained in the present invention is considered as follows: A refined pulp in unbeaten state may form a sheet with low strength, high bulkiness and high water dispersibility, since a refined pulp contains a very small amount of hemicellulose which contributes to swelling of fibers and cohesion between fibers. When the refined pulp is beaten, the water retention is not increased much, the fiber becomes rigid and easily cut, and the short fiber content increases, since swelling and fibrillation of the fiber are suppressed due to the beating, since the hemicellulose content is small. As a result, it is considered that the water dispersibility of the sheet formed from the beaten refined pulp is not significantly impaired, because the short fiber content, which contributes to the improvement of water dispersibility, increases, although the strength increases and the bulkiness is slightly impaired compared to when not beaten.

In the present invention, the α-cellulose content is used as an index of the cellulose purity of the refined pulp. The α-cellulose content of the refined pulp needs to be 88% by weight or more, preferably 92% by weight or more, and more preferably 95% by weight or more. When the α-cellulose of the refined pulp is less than 88% by weight, the pulp becomes difficult to disperse into single fibers and thus the dispersibility in water is reduced. In the present invention, the α-cellulose content is a value measured for α-cellulose as specified in TAPPI Standard T203om-83 (Japanese Industrial Standard (JIS) P8101-1994 (currently out of print)).

The hemicellulose content may be used as another index of the cellulose purity of the refined pulp in the present invention. In this case, the hemicellulose content of the refined pulp needs to be less than 12% by weight, preferably less than 8% by weight, more preferably less than 5% by weight. When the hemicellulose content of the refined pulp is 12% by weight or more, the dispersibility in water is reduced since the pulp becomes difficult to disperse into single fibers. In the present invention, the content of hemicellulose can be measured by acid-hydrolyzing refined pulp or unrefined pulp into monosaccharides and quantifying the monosaccharides by an alditol acetate method. That is, the monosaccharides obtained by a hydrolysis of pulp are reduced with sodium borohydride and converted into the corresponding alditol acetate, which is then acetylated with acetic anhydride and pyridine to form an alditol acetate derivative, then the constituent sugars are identified and quantified by analyzing the formed alditol acetate derivative by gas chromatography.

In addition, the α-cellulose content and the hemicellulose content can also be measured for a paper formulated with refined pulp and unrefined pulp, in the same way as for pulp alone.

Further, the α-cellulose content and the hemicellulose content can be calculated each for refined pulp and unrefined pulp after obtaining the blending ratio of the refined pulp and the unrefined pulp by observing the fiber morphology of the pulp.

The mixed pulp in the present invention does not contain regenerated cellulose fibers such as rayon, fibrous carboxyalkyl cellulose, and fibrous carboxyalkyl cellulose salts (e.g., CMC-Na salt).

Regenerated cellulose fiber has poor printability due to insufficient sheet strength and smoothness. Fibrous carboxyalkyl cellulose is acidic, and the acidity has an adverse effect depending on the use. The base paper made of a fibrous carboxyalkyl cellulose salt contains an alkaline compound remaining in the base paper, which adversely affects depending on the use, and is liable to be discolored.

As will be described later, no such problems occur when the aqueous dispersion sheet is impregnated or coated with an aqueous solution of a neutral water-soluble polymer by size press coating or the like after papermaking.

The inner layer constituting the paper substrate of the present invention comprises a mixed pulp, which comprises a wood pulp and a refined pulp with α-cellulose content of 88% by weight or more, wherein the content of the wood pulp in the mixed pulp is from 50 to 95% by weight, preferably from 40 to 70% by weight.

The Canadian standard freeness of the mixed pulp used in the inner layer is 600 to 750 ml CSF, preferably 630 to 720 ml CSF. The Canadian Standard Freeness is that measured in accordance with Japanese Industrial Standard (JIS) P8121-2 2012 (the same applies hereinafter).

As the beating proceeds (the freeness decreases), fibrillation, cutting and internal swelling of the fiber proceed, then the density, strength and smoothness of the base paper increase, while the water dispersibility decreases.

The surface layer (including the first surface layer and the second surface layer) comprises a mixed pulp of a wood pulp and a refined pulp with α-cellulose content of 88% by weight or more. The Canadian standard freeness of the mixed pulp in the surface layer (the first surface layer) on which the tacky adhesive layer is installed is 450 to 600 ml CSF, preferably 500 to 575 ml CSF, and the content of a wood pulp in the mixed pulp is 50 to 85 weight %, preferably 65 to 80 weight %.

The surface pH of the surface layer in such composition is 6 to 8 (neutral region).

On the other hand, the Canadian standard freeness of the mixed pulp and the content of the wood pulp in the mixed pulp in the surface layer (the second surface layer) on which the tacky adhesive layer is not installed are appropriately set according to the intended use of it. These compositions of the second surface layer may be, for example, the same as the composition of the first surface layer or the same as the composition of the inner surface layer.

In order to make the Canadian standard freeness of the mixed pulp used for the inner layer and the surface layer within the above range, the wood pulp and the refined pulp may have the same or different Canadian standard freeness. The mixed pulp may be obtained by beating a wood pulp and a refined pulp separately to mix these, or obtained by mixing an unbeaten wood pulp and an unbeaten refined pulp to beat the mixture.

In the present invention, since the base paper has such multilayer structure (two layers or three layers) and the surface layer (first surface layer) on which the tacky adhesive layer is installed has the above-described composition, the time degradation of the tacky adhesiveness of the tacky adhesive layer can be suppressed, while maintaining the water dispersibility.

The basis weight of the base paper of the present invention is usually 10 to 200 $g/m^2$, and in particular, it is suitably 50 $g/m^2$ or more in general, preferably 50 to 120 $g/m^2$ as the base paper of coated paper for printing.

The basis weight of each layer is usually in the range of 5 to 100 $g/m^2$, preferably 10 to 100 $g/m^2$.

In the water-dispersible sheet of the present invention, a tacky adhesive layer is installed on one of the surface layer (first surface layer).

As the tacky adhesive composing the tacky adhesive layer, a tacky adhesive having water-solubility or water re-dispersibility, particularly a water-soluble acrylic tacky adhesive is suitably used.

Examples of the water-soluble acrylic tacky adhesive include those containing, as a base polymer, those comprise a copolymer comprising alkoxyalkyl acrylate and styrene sulfonate and other copolymerizable monomer, or a copolymer of a carboxyl group-containing vinyl monomer such as (meth) acrylic acid and a hydroxyl group-containing monomer and optionally other copolymerizable monomer, and the like. Examples of the water re-dispersible acrylic tacky adhesive include those containing, as a base polymer, those comprise a copolymer of an alkyl (meth) acrylate ester, a carboxyl group-containing vinyl monomer, a vinyl monomer having an alkoxy group, and optionally other copolymerizable monomer, or a copolymer obtained by copolymerization of carboxylated rosin ester-containing vinyl monomer, carboxyl group-containing vinyl monomer and water soluble vinyl monomer, and the like. The carboxyl group of these copolymers may be in the form of a salt in which a part or the whole thereof is neutralized with an alkali as necessary, in which alkali metal salts, amine salts and alkanolamine salts are preferable as the alkali.

A crosslinking agent may be added to the water-soluble acrylic tacky adhesive in order to adjust the adhesion strength, water solubility or water dispersibility. Such crosslinking agent is not particularly limited, but arbitrary ones can be appropriately selected from those conventionally used as crosslinking agents in acrylic tacky adhesives. Examples the crosslinking agent include, for example, isocyanate crosslinking agent such as 1,2-ethylene diisocyanate, epoxy type crosslinking agent such as diglycidyl ether, melamine resins, urea resins, dialdehydes, methylol polymers, metal chelate compounds, metal alkoxides, metal salts and the like. A conventionally known plasticizer, tackifier, colorant, thickener, defoaming agent, leveling agent, plasticizer, antifungal agent, antioxidant and the like may be added to the acrylic tacky adhesive in order to adjust the properties as necessary and to improve the performance. The plasticizer and the tackifier are preferably water-soluble or water-dispersible. Examples of the plasticizer include polyhydric alcohols such as sugar alcohols, polyether polyols, alkanolamine salts of oxidized rosin, and the like. And examples of the tackifier include alkali metal salts such as rosin, disproportionated rosin and hydrogenated rosin, ammonium salts, polyether esters and the like.

These tacky adhesives may be (i) directly applied on one of the surface layers (first surface layer) of the base paper, or (ii) applied on the release agent containing surface of the release sheet to form a tacky adhesive layer, which is then adhered to the surface layer (first surface layer) of the base paper to transfer the adhesive layer to the surface layer of the base paper. In either case, a release sheet may be pasted on the adhesive layer and peeled off at the time of use as desired, in order to prevent unnecessary adhesion at times other than use. The coating amount (solid content) of the tacky adhesive layer formed on the base paper is about 3 to 60 $g/m^2$, preferably about 10 to 50 $g/m^2$. When the tacky adhesive coating amount is less than 5 $g/m^2$, the formed tacky adhesive sheet is insufficient in tacky adhesiveness. On the other hand, when the tacky adhesive coating amount exceeds 60 $g/m^2$, the tacky adhesive easily protrudes during production of the tacky adhesive sheet or in a post-processing step, which is not preferable.

The release sheet is not particularly limited and conventionally known release sheet may be used, for example, paper base materials such as glassine paper, coated paper, cast coated paper; laminated paper obtained by laminating thermoplastic resins such as polyethylene etc. on these base paper materials; or various plastic films such as polyethylene terephthalate, polypropylene, polyethylene and the like, on whose one side or both sides release agent such as silicone resin are applied. The basis weight of the release sheet is not particularly limited, but it is usually about 20 to 120 $g/m^2$.

The application of the tacky adhesive may be carried out by a printing method and the tacky adhesive may be applied in a pattern shape excluding an edge portion and the like. And the release sheet used in this case may also be partially coated with a release agent corresponding to the pattern shape of the tacky adhesive. Furthermore, a releasing agent is partially coated on the coating side of the water-releasable coated paper of the present invention on the side without the alkalizing agent applied, in a dotted or rectangular noncontiguous pattern, while the adhesive is partially coated on one of the surface layers (first surface layer) in a pattern corresponding to the releasing agent, then the partially adhesive coated surface and the release agent partially coated surface are superimposed to form a tacky adhesive sheet which does not require a release sheet.

In order to further improve the the water dispersibility (particularly, fiber dispersion time) and the dry strength of the water-dispersible sheet of the present invention, a water-soluble polymer may be impregnated or coated on the surface of the water-dispersible sheet. A neutral (pH 6 to 8) solution (e.g., a neutral aqueous solution) may be used, when impregnating or applying the water-soluble polymer on the sheet, The method for impregnating or coating is not particularly limited, but size press coating (usually two-roll size press coating), transfer roll coating, spray coating, gravure coating, curtain coating, or the like may be used. Among these methods, size press coating is preferable from the viewpoint of productivity.

The fibers in the water-dispersible sheet of the present invention can be easily separated by impregnating or coating a water-soluble polymer on the surface layer of the water-dispersible sheet with the configuration described above, since the space between the fibers of the base paper is filled with the water-soluble polymer, and the dry strength of the water-dispersible sheet increases, then the water-soluble polymer present in the space swells due to contact with water to spread between the fibers.

As the water-soluble polymer, a polymer whose dry film is easily redissolved in water is preferable. As this water-soluble polymer, for example, anionic polyelectrolyte salts, such as carboxylalkyl cellulose salts, alginates, pectate, polyacrylate, polymethacrylate, carboxyalkylated starch, phosphorylated starch, anionic polyacrylamide; polymer electroless, such as methyl cellulose, hydroxyalkyl cellulose, polyvinyl alcohol, polyvinyl pyrrolidone, polyalkylene oxide, polyvinyl ethyl ether, hydroxyethylated starch, oxidized starch and pregelatinized starch; water-soluble polysaccharides, such as guar gum, trant gum, xanthan gum, gum arabic, carrageenan, galactomannan, pullulan, dextran, dextrin; water-soluble proteins, such as gelatin and casein, and the like may be cited. These can be used alone or in combination of two or more. Among them, carboxymethyl-cellulose salt is preferably used from the viewpoint of improving water dispersibility and strength.

Arbitrary coating layers such as thermosensitive recording layer or inkjet recording layer may be installed on the other side (i.e. second surface layer) of the water-dispersible sheet of the present invention, opposite to the tacky adhesive layer, depending on the application.

The coating layer in the present invention may be a single layer or a multilayer as long as it is formed by coating and drying aqueous coating materials, and the coating method is not limited. In addition, the components of the coating layer may be appropriately chosen from those suitable for the coating or printing method (offset printing, gravure printing, inkjet printer, thermal printer, laser beam printer, etc.).

Examples of the coating layers suitable for thermal printers, inkjet printers, and gravure printing are shown below.

(I) Example of Coating Layer (Thermosensitive Recording Layer) Suitable for Thermal Printers:

In order to adapt the water dispersible sheet of the present invention to printing with a thermal printer, a thermosensitive recording layer containing, as main components, a colorless or pale electron donating leuco dye (henceforth referred to as "leuco dye") and an electron accepting color developing agent (henceforth referred to as "color development agent") is installed on the second surface of the base paper. An undercoat coating layer comprising a pigment and a binder as main components may be installed between the base paper and the thermosensitive recording layer. Since the base paper has a porous layer (with high heat insulating effect) containing refined pulp with α-cellulose content of 88% by weight or more, the debris forming and the sticking properties are improved.

The smoothness of the surface of the base paper on which the undercoat layer is installed is not particularly limited, but in general, a highly smooth surface is preferred, and a Yankee dryer contacted surface and a calendaring treated surface are suitably used.

The undercoat layer is installed to enhance the smoothness of the surface of the base paper and achieve sharpness and high sensitivity of the image in the thermosensitive recording medium. Any known binders and various additives are properly selected to be used for the undercoat layer.

As the pigment for the undercoat layer, inorganic pigments such as silica, calcium carbonate, clay, kaolin, calcined kaolin, diatomaceous earth, talc, titanium oxide, aluminum hydroxide, magnesium carbonate, zinc oxide, aluminum oxide, magnesium hydroxide, barium sulfate, calcium sulfate, zinc sulfate, calcium silicate, aluminum silicate, magnesium silicate, sodium aluminosilicate and magnesium aluminosilicate and the like, or organic pigments such as melamine resin pigment, urea-formalin resin pigment, polyethylene powder, nylon powder and the like may be mentioned.

As the binder of the undercoat layer, water-soluble resins and water-dispersible resins are preferable, the example include starches, hydroxyethyl cellulose, methylcellulose, carboxymethyl cellulose, gelatin, casein, sodium alginate, polyvinyl alcohol, modified polyvinyl alcohol, polyvinyl pyrrolidone, polyacrylamide, acrylamide/acrylate copolymer, styrene/maleic anhydride copolymer and alkali salt thereof, ethylene/maleic anhydride copolymer and alkali salt thereof, sodium polyacrylate and the like. Among them, from the viewpoint of water releasability, it is desirable to use water-soluble resins such as starch, hydroxyethyl cellulose, methyl cellulose, carboxymethyl cellulose, gelatin, casein, sodium alginate, polyvinyl alcohol, modified polyvinyl alcohol, polyvinyl pyrrolidone as the main component of the binder.

The amount (solid content) of the binder in the undercoat layer is usually 5 to 100 parts by weight per 100 parts by weight of the pigment.

In addition to the pigment and the binder, commonly used various additives may be used for the undercoat layer. Examples of the various additives include pigment dispersants, defoaming agents, lubricants, UV absorbers, sizing agents, sensitizers, fluorescent dyes, preservatives, and the like.

The undercoat layer may be obtained by applying the coating material obtained by dispersing and mixing the pigment and the binder with other additives in one layer or multi-layers by using a coating machine then drying by heating it by using a dryer or the like. The coating amount (solid content) of the undercoat layer is usually 0.5 to 50 g/m², preferably 3 to 15 g/m². Examples of the coating machine include air knife coater, bar coater, roll coater, blade coater, curtain coater, champlex coater, gravure coater etc.

As the leuco dyes used for the thermosensitive recording layer of the present invention, any known leuco dyes can be used solely or in combination of two or more, and in particular, leuco compounds of dye such as triphenylmethane type, fluoran type, phenothiazine type, auramine type, spiropyran type, indolinophthalide type and the like are preferably used. Examples of the leuco dyes include 3,3-bis (p-Dimethyl aminophenyl)-phthalide, 3,3-bis(p-Dimethyl aminophenyl)-6-dimethylaminophthalide [alternate name: crystal violet lactone], 3,3-bis(p-Dimethyl aminophenyl)-6-diethylaminophthalide, 3,3-bis(p-Dimethyl aminophenyl)-6-chlorophthalide, 3,3-bis(p-Dibuthyl aminophenyl)-phthalide, 3-cyclohexylamino-6-chlorofluoran, 3-dimethylamino-5,7-dimethylfluoran, 3-diethylamino-7-chlorofluoran, 3-diethylamino-7-methylfluoran, 3-diethylamino-7,8-benzfluorane, 3-diethylamino-6-methyl-7-chlorofluoran, 3-(N-p-tolyl-N-ethylamino)-6-methyl-7-anilinofluoran, 3-pyrrolidino-6-methyl-7-anilinofluoran, 2-{N-(3'-trifluoromethylphenyl) amino}-6-diethylaminofluoran, 2-{3,6-bis (diethylamino)-9-(o-chloroanilino) xanthylbenzoic acid lactam}, 3-diethylamino-6-methyl-7-(m-trichloromethylanilino) fluoran, 3-diethylamino-7-(o-chloroanilino) fluoran, 3-di-n-butylamino-7-(o-chloroanilino) fluoran, 3-N-methyl-N, n-amylamino-6-methyl-7-anilinofluoran, 3-N-methyl-N-cyclohexylamino-6-methyl-7-anilinofluoran, 3-diethylamino-6-methyl-7-anilinofluoran, 3-(N, N-diethylamino)-5-methyl-7-(N, N-dibenzylamino) fluoran, Benzoyl leuco methylene blue, 6'-chloro-8'-methoxy-benzoindolino-spiropyran, 6'-bromo-3'-methoxy-benzoindolino-spiropyran, 3-(2'-hydroxy-4'-dimethylaminophenyl)-3-(2'-methoxy-5'-chlorophenyl) phthalide, 3-(2'-hydroxy-4'-dimethylaminophenyl)-3-(2'-methoxy-5'-nitrophenyl) phthalide, 3-(2'-hydroxy-4'-diethylaminophenyl)-3-(2'-methoxy-5'-methylphenyl) phthalide, 3-(2'-methoxy-4'-dimethylaminophenyl)-3-(2'-hydroxy-4'-chloro-5'-methylphenyl) phthalide, 3-(N-ethyl-N-tetrahydrofurfuryl) amino-6-methyl-7-anilinofluoran, 3-N-ethyl-N-(2-ethoxypropyl) amino-6-methyl-7-anilinofluoran, 3-N-methyl-N-isobutyl-6-methyl-7-anilinofluoran, 3-morpholino-7-(N-propyl-trifluoromethylanilino) fluoran, 3-pyrrolidino-7-m-trifluoromethylanilinofluoran, 3-diethylamino-5-chloro-7-(N-benzyl-trifluoromethylanilino) fluoran, 3-pyrrolidino-7-(di-p-chlorophenyl) methylaminofluoran, 3-diethylamino-5-chloro-7-(α-phenylethylamino) fluoran, 3-(N-ethyl-p-toluidino)-7-(α-phenylethylamino) fluoran, 3-diethylamino-7-(o-methoxycarbonylphenylamino) fluoran, 3-diethylamino-5-methyl-7-(α-phenylethylamino) fluoran, 3-diethylamino-7-piperidinofluoran, 2-chloro-3-(N-methyltoluidino)-7-(p-n-butylanilino) fluoran, 3-(N-methyl-N-isopropylamino)-6-methyl-7-anilinofluoran, 3-di-n-butylamino-6-methyl-7-anilinofluoran, 3,6-bis (dimethylamino) fluorene spiro (9,3')-6'-dimethylaminophthalide, 3-(N-benzyl-N-cyclohexylamino)-5,6-benzo-7-α-naphthylamino-4'-bromofluoran, 3-diethylamino-6-chloro-7-anilinofluoran, 3-diethylamino-6-methyl-7-mesityzino-4',5'-benzofluoran, 3-N-methyl-N-isopropyl-6-methyl-7-anilinofluoran, 3-N-ethyl-N-isoamyl-6-methyl-7-anilinofluoran, 3-Diethyl-amino-6-methyl-7-(2',4'-dimethylanilino) fluoran, and the like.

The water dispersible sheet of the present invention are possibly used in an application to be washed away to a drainage groove after use, therefore, among these, preferably used are leuco dyes with higher safety from the viewpoint of environment, such as 3-diethylamino-6-methyl-7-anilinofluoran, 3-dibutylamino-6-methyl-7-anilinofluoran, 3-(N-cyclohexyl-N-methylamino)-6-methyl-7-anilinofluoran, 3-(N-ethyl-N-isopentylamino)-6-methyl-7-anilinofluoran, 3-N-di-n-pentylamino-6-methyl-7-anilinofluoran, 3-diethylamino-7-(3-trifluoromethylanilino) fluoran, 3-(N-ethyl-N-4-methylphenylamino)-6-methyl-7-anilinofluoran, 3-diethylamino-6-methyl-7-(3-methyl-anilino) fluoran, 3,3'-bis (dimethylaminophenyl)-6-dimethylaminophthalide, 3-(4-diethylamino-2-ethoxyphenyl)-3-(1-ethyl-2-methylindol-3-yl)-4-azaphthalide, 2-(N-phenyl-N-methylamino)-6-(N-p-tolyl-N-ethylamino) fluoran, 3,3-bis (1-n-butyl-2-methylindol-3-yl) phthalide, 1,3-dimethyl-6-diethylaminofluoran, 3-Bromo-3-methyl-6-dibutylamino-fluoran, and the like.

As the color developing agent contained in the thermosensitive recording layer together with the leuco dye, phenols, organic acids or inorganic acids or their esters, salts and the like may be used. Example of the color developing agent include gallic acid, salicylic acid, 3-isopropylsalicylic acid, 3-cyclohexylsalicylic acid, 3,5-di-tert-butylsalicylic acid, 3,5-di-α-methylbenzylsalicylic acid, 4,4'-isopropylidenediphenol, 1,1'-isopropylidenebis (2-chlorophenol), 4,4'-isopropylin bis (2,6-dibromophenol), 4,4'-isopropylidenebis (2,6-dichlorophenol), 4,4'-isopropylidenebis (2-methylphenol), 4,4'-isopropylidenebis (2,6-dimethylphenol), 4,4-isopropylidenebis (2-tert-butylphenol), 4,4'-sec-butylidenedinebol, 4,4'-cyclohexylidene bisphenol, 4,4'-cyclohexylidene bis (2-methylphenol), 4-tert-butylphenol, 4-phenylphenol, 4-hydroxydiphenoxide, α-naphthol, β-naphthol, 3,5-xylenol, thymol, methyl-4-hydroxybenzoate, 4-hydroxyacetophenone, novolac type phenolic resin, 2,2'-thiobis (4,6-dichlorophenol), catechol, resorcin, hydroquinone, pyrogallol, fluoroglycine, fluoroglycine carboxylic acid, 4-tert-octyl catechol, 2,2'-methylenebis (4-chlorophenol), 2,2'-methylenebis (4-methyl-6-tert-butylphenol), 2,2'-dihydroxydiphenyl, ethyl p-hydroxybenzoate, propyl p-hydroxybenzoate, butyl p-hydroxybenzoate, benzyl p-hydroxybenzoate, p-hydroxybenzoic acid-p-chlorobenzyl, p-hydroxybenzoic acid-o-chlorobenzyl, p-hydroxybenzoic acid-p-methylbenzyl, p-hydroxybenzoic acid-n-octyl, benzoic acid, zinc salicylate, 1-hydroxy-2-naphthoic acid, 2-hydroxy-6-naphthoic acid, zinc 2-hydroxy-6-naphthoate, 4-hydroxydiphenyl sulfone, 4-hydroxy-4'-chlorodiphenyl sulfone, bis (4-hydroxyphenyl) sulfide, 2-hydroxy-p-toluic acid, zinc 3,5-di-tert-butylsalicylate, 3,5-di-tert-butyl salicylate, tartaric acid, oxalic acid, maleic acid, citric acid, succinic acid, stearic acid, 4-hydroxyphthalic acid, boric acid, thiourea derivatives, 4-hydroxythiophenol derivatives, bis (4-hydroxyphenyl) acetic acid, ethyl bis (4-hydroxyphenyl) acetate, N-propyl bis (4-hydroxyphenyl) acetate, N-butyl bis (4-hydroxyphenyl) acetate, phenyl bis (4-hydroxyphenyl) acetate, bis (4-hydroxyphenyl) acetate benzyl, phenethyl bis (4-hydroxyphenyl) acetate, bis (3-methyl-4-hydroxyphenyl) acetic acid, methyl bis (3-methyl-4-hydroxyphenyl) acetate, N-propyl bis (3-methyl-4-hydroxyphenyl) acetate, 1,7-bis (4-hydroxyphenylthio) 3,5-dioxaheptane, 1,5-bis (4-hydroxyphenylthio) 3-oxapentane, dimethyl 4-hydroxyphthalate, 4-hydroxy-4'-methoxydiphenyl sulfone, 4-hydroxy-4'-ethoxydiphenyl sulfone, 4-hydroxy-4'-isopropoxy diphenyl sulfone, 4-hydroxy-4'-propoxy diphenyl sulfone, 4-hydroxy-4'-butoxydiphenyl sulfone, 4-hydroxy-4'-isobutoxydiphenyl sulfone, 4-hydroxy-4'-sec-butoxydiphenyl sulfone, 4-hydroxy-4'-tert-butoxydiphenyl sulfone, 4-hydroxy-4'-benzyloxy diphenyl sulfone, 4-hydroxy-4'-phenoxydiphenyl sulfone, 4-hydroxy-4'-(m-methylbenzyloxy) diphenyl sulfone, 4-hydroxy-4'-(p-methylbenzyloxy) diphenyl sulfone, 4-hydroxy-4'-(o-methylbenzyloxy) diphenyl sulfone, 4-hydroxy-4'-(p-chlorobenzyloxy) diphenylsulfone and the like.

The water dispersible sheet of the present invention are possibly used in an application to be washed away to a drainage groove after use, therefore, among these, preferably used are color developing agents with higher safety from the viewpoint of environment, such as 4,4'-dihydroxydiphenyl sulfone, 2,4'-dihydroxydiphenyl sulfone, 4-hydroxy-4'-isopropoxy diphenyl sulfone, benzyl parahydroxybenzoate, 4-hydroxy-4'-propoxy diphenyl sulfone, 3-{[(phenylamino) carbonyl] amino} benzenesulfonamide, N-(4'-hydroxyphenylthio) acetyl-2-hydroxyaniline, 1:1 mixture of N-(4'-hydroxyphenylthio) acetyl-4-hydroxyaniline and N-(4'-hydroxyphenylthio) acetyl-2-hydroxyaniline, 4,4'-bis (3-(phenoxycarbonylamino) methylphenylureido) diphenyl sulfone, composition of color developing agents containing 2,2'-bis [4-(4-hydroxyphenylsulfone) phenoxy] diphenyl ether, and the like.

Any known binders can be used for the thermosensitive recording layer. Examples of the main ingredient of the binder include polyvinyl alcohols such as fully saponified polyvinyl alcohol and partially saponified polyvinyl alcohol; modified polyvinyl alcohols such as carboxy-modified polyvinyl alcohol, amide-modified polyvinyl alcohol, sulfonic acid-modified polyvinyl alcohol, butyral-modified polyvinyl alcohol; water-soluble resin such as hydroxyethyl cellulose, methyl cellulose, carboxymethyl cellulose, starches, gelatin, casein, sodium alginate, polyvinyl pyrrolidone, polyacrylamide, acrylamide/acrylate copolymer, alkali salt of styrene/maleic anhydride copolymer, alkali salt of ethylene/maleic anhydride copolymer; water dispersible resins such as styrene-butadiene copolymer, acrylonitrile/butadiene copolymer, methyl acrylate/butadiene copolymer, acrylonitrile/butadiene/styrene terpolymer, cellulose derivatives such as ethyl cellulose, acetyl cellulose, polyvinyl chloride, polyvinyl acetate, vinyl acetate/acrylic acid ester copolymer, ethylene/vinyl acetate copolymer, polyacrylic esters, styrene/acrylate copolymer, polyurethane resin, polyvinyl butyral polystyrene and copolymers thereof, polyamide resin, silicone resin, petroleum resin, terpene resin, ketone resin, coumarone resin. These may be used by being dissolved into a solvent such as water, alcohol, ketone, ester, hydrocarbon, etc. These also may be used in a state of being emulsified or paste dispersed in water or other medium, and these may also be used in combination depending on the required quality. Among these, water-soluble resins are preferably used as the main ingredient of the binder from the viewpoint of water releasability, such as starches, hydroxyethyl cellulose, methyl cellulose, carboxymethyl cellulose, gelatin, casein, sodium alginate, polyvinyl alcohols, modified polyvinyl alcohols, and polyvinylpyrrolidone.

In the thermosensitive recording layer, auxiliary additives may be used together with the leuco dye, the color developing agent and the binder, if necessary. Examples of the auxiliary additives include sensitizers, pigments, stabilizers such as p-nitrobenzoic acid metal salt (Ca, Zn) or phthalic acid monobenzyl ester metal salt (Ca, Zn), releasing agents such as fatty acid metal salt, lubricants such as waxes, pressure coloring preventing agents, benzophenone and triazole UV absorbers, waterproofing agents such as glyoxal, dispersing agents, antifoaming agents, etc.

Thermoplastic materials are used as a sensitizer to improve the thermal responsiveness, and a thermoplastic organic compound with a melting point of about 50 to 200 degree C. may be used Examples of such thermoplastic organic compound include stearic acid amide, palmitic acid amide, N-hydroxymethylstearic acid amide, N-stearyl stearic acid amide, ethylene bis stearic acid amide, N-stearyl urea, benzyl-2-naphthyl ether, m-terphenyl, 4-benzylbiphenyl, 2,2'-bis (4-methoxyphenoxy) diethyl ether, α, α'-diphenoxyxylene, bis (4-methoxyphenyl) ether, diphenyl adipate, dibenzyl oxalate, di (4-chlorobenzyl) oxalate, dimethyl terephthalate, dibenzyl terephthalate, benzenesulfonic acid phenyl ester, bis (4-allyloxyphenyl) sulfone, 4-acetylacetophenone, acetoacetic acid anilides, fatty acid anilides, montan wax, polyethylene wax, benzyl p-benzyloxybenzoate, di-p-tolyl carbonate, phenyl-α-naphthyl carbonate, 1,4-diethoxynaphthalene, 1-hydroxy-2-naphthoic acid phenyl ester, 1,2-bis-(3-methylphenoxy) ethane, di (p-methylbenzyl) oxalate, 1,2-bis (phenoxymethyl) benzene, diphenyl sulfone, para phenyl acetophenone, ß-benzyloxynaphthalene, 4-biphenyl-p-tolyl ether, o-xylerine-bis-(phenyl ether), 4-(m-methylphenoxymethyl) biphenyl and the like.

The water dispersible sheet of the present invention are possibly used in an application to be washed away to a drainage groove after use, therefore, among these, preferably used are sensitizers with higher safety from the viewpoint of environment, such as stearic acid amide, palmitic acid amide, ethylene bis stearic acid amide, benzyl p-benzyloxybenzoate, 4-biphenyl-p-tolyl ether, di (p-methylbenzyl) oxalate, di (4-chlorobenzyl) oxalate, 4-benzylbiphenyl, 1,2-bis (phenoxymethyl) benzene, diphenyl sulfone, ß-benzyloxynaphthalene, paraphenylacetophenone, 1,2-bis-(3-methylphenoxy) ethane, and the like.

Examples of the pigments include inorganic filler, such as silica, calcium carbonate, clay, kaolin, calcined kaolin, diatomaceous earth, talc, titanium oxide, aluminum hydroxide, magnesium carbonate, zinc oxide, aluminum oxide, magnesium hydroxide, barium sulfate, calcium sulfate, zinc sulfate, calcium silicate, aluminum silicate, magnesium silicate, sodium aluminosilicate, magnesium aluminosilicate and the like; or organic pigments, such as melamine resin pigment, urea-formalin resin pigment, polyethylene powder, nylon powder and the like.

The types and amounts of the leuco dye, color developing agent, sensitizer and other various ingredients are determined according to the required performance and printability and are not particularly restricted. However, from 0.5 parts to 10 parts of the color developing agent and from 0.5 parts to 10 parts of the sensitizer are ordinarily used per 1 part of the leuco dye, and the amount of the binder is suitably 5 to 50% by weight in the total solid content.

The leuco dye, the color developing agent and the materials added when needed are finely ground into particles, several microns or smaller in size, using a grinder or a suitable emulsification device such as a ball mill, attritor, sand grinder and the like, and a coating solution is prepared by adding a binder and various additive materials depending on the objective.

The method for forming the thermosensitive recording layer is not limited in particular, and the layer is formed by, for example, coating and drying the coating material on the base paper by a method such as various printing methods such as planographic printing, or air knife coating, rod blade coating, bar coating, blade coating, gravure coating, curtain coating and the like. The coating amount of the thermosensitive recording layer is usually in the range of from 2 to 12 $g/m^2$, preferably from 3 to 10 $g/m^2$.

Also, the matching property with the thermal head or the like and the storage image storage property can be improved by optionally installing a protective layer on the thermosensitive recording layer.

As the binder used for the protective layer, the same type as the binder used for thermosensitive recording layer may be used. Examples of the main ingredient of the binder include polyvinyl alcohols such as fully saponified polyvinyl alcohol and partially saponified polyvinyl alcohol; modified polyvinyl alcohols such as carboxy-modified polyvinyl alcohol, amide-modified polyvinyl alcohol, sulfonic acid-modified polyvinyl alcohol, butyral-modified polyvinyl alcohol; water-soluble resin such as hydroxyethyl cellulose, methyl cellulose, carboxymethyl cellulose, starches, gelatin, casein, sodium alginate, polyvinyl pyrrolidone, polyacrylamide, acrylamide/acrylate copolymer, alkali salt of styrene/maleic anhydride copolymer, alkali salt of ethylene/maleic anhydride copolymer; water dispersible resins such as styrene-butadiene copolymer, acrylonitrile/butadiene copolymer, methyl acrylate/butadiene copolymer, acrylonitrile/butadiene/styrene terpolymer, cellulose derivatives such as ethyl cellulose, acetyl cellulose, polyvinyl chloride, polyvinyl acetate, vinyl acetate/acrylic acid ester copolymer, ethylene/vinyl acetate copolymer, polyacrylic esters, styrene/acrylate copolymer, polyurethane resin, polyvinyl butyral polystyrene and copolymers thereof, polyamide resin, silicone resin, petroleum resin, terpene resin, ketone resin, coumarone resin. These may be used by being dissolved into a solvent such as water, alcohol, ketone, ester, hydrocarbon, etc. These also may be used in a state of being emulsified or paste dispersed in water or other medium, and these may also be used in combination depending on the required quality. Among these, water-soluble resins are preferably used as the main ingredient of the binder from the viewpoint of water releasability, such as starches, hydroxyethyl cellulose, methyl cellulose, carboxymethyl cellulose, gelatin, casein, sodium alginate, polyvinyl alcohols, modified polyvinyl alcohols, and polyvinylpyrrolidone.

Examples of the additives used for the protective layer include pigments, surfactants, lubricants, pressure coloring inhibitors, and the like. The specific examples of the pigment and the lubricant are the same as those exemplified in the thermosensitive recording layer. The protective layer is obtained by preparing the coating material by dispersing and mixing various additives in the binder, applying the coating material in one or more layers by a coating machine and drying it by heating with a dryer.

The coating amount (solid content) of the protective layer is usually 0.2 to 10 $g/m^2$, preferably 0.5 to 5 $g/m^2$. The coating machine is not particularly limited, and known coating machines can be used such as air knife coater, bar coater, roll coater, blade coater, curtain coater, champlex coater, gravure coater and the like.

In the present invention, it is preferable to increase the surface smoothness of the thermosensitive recording layer side of the water dispersible sheet in order to improve the image sharpness and sensitivity by using a smoothing device such as calendar, super calendar, soft nip calender or the like.

The Bekk smoothness on the surface of the thermosensitive recording layer side is preferably 50 to 2000 seconds, more preferably 100 to 2000 seconds. If the Bekk smoothness is less than 50 seconds, the effect of improving the image sharpness and sensitivity may be poor. Also, if the Bekk smoothness exceeds 2000 seconds, a decrease in water dispersibility may become apparent due to the increase in the density of the base paper, which is not preferable.

(II) Example of Coating Layer Suitable for Inkjet Printers (Inkjet Recording Layer):

In order to adapt the water-dispersible sheet of the present invention to printing with an inkjet printer, it is preferable to install, on the second surface layer of the base paper, a pigment coating layer comprising a pigment and an aqueous binder as main components or a clear coat layer comprising a cationic resin and/or an aqueous binder as main components. The pigment, binder and various additives may be selected appropriately from any known pigments, binders and various additives and used, and the compounding amounts of these may be appropriately adjusted according to the required quality. In addition, since the base paper contains a porous layer (having high ink absorbability) comprising refined pulp with α-cellulose content of 88% by weight or more, it has an improved ink absorbability.

Examples of the pigments include inorganic pigments such as silica, colloidal silica, calcium carbonate, clay, kaolin, calcined kaolin, diatomaceous earth, talc, titanium oxide, aluminum hydroxide, magnesium carbonate, zinc oxide, aluminum oxide, magnesium hydroxide, barium sulfate, calcium sulfate, zinc sulfate, calcium silicate, aluminum silicate, magnesium silicate, sodium aluminosilicate, magnesium aluminosilicate, calcium carbonate complex silica; or organic pigments such as melamine resin pigment, urea-formalin resin pigment,polyethylene powder, nylon powder, styrene, styrene-acryl, acryl. Among these, silica, alumina, calcined kaolin, calcium carbonate or the like are preferably used from the viewpoints of ink absorbability and coloring property.

As the binder, water-soluble resins and water-dispersible resins are preferred, such as starch, hydroxyethyl cellulose, methyl cellulose, carboxymethyl cellulose, gelatin, casein, sodium alginate, polyvinyl alcohol, modified polyvinyl alcohol, polyvinyl pyrrolidone, polyacrylamide, acrylamide/acrylate copolymer, styrene/maleic anhydride copolymer and its alkali salt, ethylene/maleic anhydride copolymer and its alkali salt, styrene/butadiene copolymer, sodium polyacrylate, vinyl acetate, ethylene-vinyl acetate, acrylic acid copolymer, methacrylic acid copolymer, acrylic acid/methacrylic acid copolymer and the like. Among these, polyvinyl alcohol, modified polyvinyl alcohol, or the like are preferably used from the viewpoints of ink absorbability and coloring property.

Examples of the additives include cationic resins (dye fixing agents), pigment dispersants, defoaming agents, lubricants, UV absorbers, sizing agents, fluorescent dyes, preservatives, and the like. Among these, cationic resin is preferably used in combination because it significantly improves the water resistance and color development of the image area.

The coating machine is not particularly limited, and air knife coater, bar coater, roll coater, blade coater, curtain coater, cast coater, champlex coater, gravure coater, two rolls coater, transfer roll coater, and the like may be used.

(III) Example of Coating Layer Suitable for Gravure Printing:

In order to adapt the water-dispersible sheet of the present invention to gravure printing, it is preferable to install, on the second surface layer of the base paper, a pigment coating layer comprising a pigment and an aqueous binder as main components or a clear coat layer comprising an aqueous binder as main components. The pigment, binder and various additives may be selected appropriately from any known pigments, binders and various additives and used. In addition, since the base paper contains a porous layer (having high cushioning property) comprising refined pulp with α-cellulose content of 88% by weight or more, it has an improved ink adherence.

Examples of the pigments include inorganic pigment such as calcium carbonate, clay, kaolin, calcined kaolin, diatomaceous earth, talc, titanium oxide, aluminum hydroxide, magnesium carbonate, zinc oxide, aluminum oxide, magnesium hydroxide, barium sulfate, calcium sulfate, zinc sulfate, calcium silicate, aluminum silicate, magnesium silicate, sodium aluminosilicate, magnesium aluminosilicate, silica, colloidal silica, calcium carbonate composite silica and the like; or organic pigment such as melamine resin pigment, urea-formalin resin pigment, polyethylene powder, nylon powder, styrene, styrene-acryl, acryl and the like.

As the binder, water-soluble resins and water-dispersible resins are preferred, such as starch, hydroxyethyl cellulose, methyl cellulose, carboxymethyl cellulose, gelatin, casein, sodium alginate, polyvinyl alcohol, modified polyvinyl alcohol, polyvinyl pyrrolidone, polyacrylamide, acrylamide/acrylate copolymer, styrene/maleic anhydride copolymer and its alkali salt, ethylene/maleic anhydride copolymer and its alkali salt, styrene/butadiene copolymer, sodium polyacrylate, vinyl acetate, ethylene-vinyl acetate, acrylic acid copolymer, methacrylic acid copolymer, acrylic acid/methacrylic acid copolymer and the like. Among these, from the viewpoint of water releasability, preferred binders are water-soluble resins such as starch, hydroxyethyl cellulose, methyl cellulose, carboxymethyl cellulose, gelatin, casein, sodium alginate, polyvinyl alcohol, modified polyvinyl alcohol, polyvinyl pyrrolidone.

Examples of the additives include cationic resins (dye fixing agents), pigment dispersants, defoaming agents, lubricants, UV absorbers, sizing agents, fluorescent dyes, preservatives, and the like.

The coating machine is not particularly limited, and air knife coater, bar coater, roll coater, blade coater, curtain coater, cast coater, champlex coater, gravure coater, two rolls coater, transfer roll coater, and the like may be used.

The water-dispersible sheet of the present invention thus obtained can, after it is adhered to a substrate such as a container or a returnable container, be easily removed from the substrate only by being rinsed off with water.

EXAMPLES

The following Examples illustrate the present invention, but the Examples are not intended to limit the scope of the present invention.

Example 1

(Preparation of Base Paper)

A hand-made paper with a three-layer structure was prepared by laminating an inner layer and two surface layers with piling up these layers together so that the two surface layers are formed on both sides of the inner layer in a weight ratio of a surface layer:an inner layer:a surface layer=1:4:1. The inner layer comprises a mixed pulp consisting of 70% by weight of softwood bleached kraft pulp (α-cellulose content is 85.6% by weight) as a wood pulp and 30% by weight of hardwood dissolving pulp (α-cellulose content is 98.3% by weight) as a refined pulp, which was beaten up to Canadian standard freeness of 675 mL CSF. The surface layers comprise a mixed pulp consisting of 15% by weight of softwood bleached kraft pulp (α-cellulose content is 85.6% by weight) and 55% by weight of hardwood bleached kraft pulp (α-cellulose content is 86.0% by weight) as wood pulps and 30% by weight of hardwood dissolving pulp (α-cellulose content is 98.3% by weight) as a refined pulp, which was beaten up to Canadian standard freeness of 500 mL CSF. The surface pH of the hand-made paper was 6.7.

Then a water-dispersible sheet was prepared by applying an aqueous solution (pH 7.1) containing a carboxymethyl cellulose sodium salt (trade name: Sunrose, manufactured by Nippon Paper Industries Co., Ltd., 2 weight % aqueous solution having a viscosity of 5 mPa-s at 20 degree C.) (hereinafter also referred to as "CMC-Na") as a water-soluble polymer on the obtained hand-made paper (with impregnation of 8 weight % to the hand-made paper) by a size press method.

(Installation of Thermosensitive Recording Layer)

First color development agent dispersion (solution A), a dye dispersion (solution B) and a sensitizer dispersion (solution C) with the following formulation were separately wet ground using sand grinders until the average particle size was about 1.0 μm.

Color Development Agent Dispersion (Solution A)

| | |
|---|---|
| 4-Hydroxy-4'-isopropoxy diphenyl sulfone (Nippon Soda Co., Ltd., D8) | 6.0 parts |
| Aqueous solution of completely saponified polyvinyl alcohol (Kuraray Co., Ltd. PVA117, solid content: 10%) | 18.8 parts |
| Water | 11.2 parts |

Leuco Dye Dispersion (Solution B)

| 3-Di-n-butylamino-6-methyl-7-anilinofluorane (Yamamoto Chemicals Inc. ODB-2) | 2.0 parts |
|---|---|
| Aqueous solution of completely saponified polyvinyl alcohol (Kuraray Co., Ltd. PVA117, solid content: 10%) | 4.6 parts |
| Water | 2.6 parts |

Sensitizer Dispersion (Solution C)

| 4-biphenyl-p-tolyl ether (Nicca Chemical Co., Ltd.) | 4.0 parts |
|---|---|
| Aqueous solution of completely saponified polyvinyl alcohol (Kuraray Co., Ltd. PVA117) | 5.0 parts |
| Water | 3.0 parts |

Next these dispersions were blended in the proportion described below to prepare the thermosensitive recording layer coating solution.
Thermosensitive Recording Layer Coating Solution

| Color development agent dispersion (Solution A) | 36.0 parts |
|---|---|
| Leuco dye dispersion (Solution B) | 9.2 parts |
| Sensitizer dispersion (Solution C) | 12.0 parts |

This thermosensitive recording layer coating solution was applied on a surface (second surface layer) of the base paper with a coating amount (in solid) of 6.0 g/m² and was dried (at 50 degree C.) to form a thermosensitive recording layer to obtain a recording paper. Then the recording paper was subjected to a smoothing treatment so that its Bekk smoothness was 500 to 1000 seconds.
(Installation of Tacky Adhesive Layer)
A tacky adhesive coating solution with the following formulation was prepared.
Tacky Adhesive Coating Material

| Water-soluble acrylic adhesive (trade name "Riki-Dyne", manufactured by VIGteQnos Corporation, solid content 42 wt %) | 100 parts by weight |
|---|---|
| Hardener (trade name "Sunpasta HD-5013", manufactured by VIGteQnos Corporation) | 0.1 parts by weight |

This tacky adhesive coating material was coated on the release treated surface of a commercially available release sheet, which is coated with a silicone release agent, with an amount (in solid) of 25 g/m² then was dried to form a tacky adhesive layer. This tacky adhesive layer was then adhered to the other side (first surface layer) of the recording paper, opposite to the thermosensitive recording layer to prepare a water dispersible sheet.

The thermosensitive recording surface of the prepared water dispersible sheet was recorded a gradational pattern by using a recording tester for thermosensitive recording paper (Okura Engineering Co. LTD., TH-PMD) with a thermal head manufactured by Kyocera Corporation at recording energy of from 0.150 mJ/dot to 0.345 mJ/dot in increments of 0.015 mJ/dot. Printing was processed without printing unevenness, and the fineness of the printed portion was good.

Example 2

A water dispersible sheet was prepared in the same manner as in Example 1 with the exception of beating the mixed pulp formulated for the surface layers up to Canadian standard freeness of 600 mL CSF.

Example 3

A water dispersible sheet was prepared in the same manner as in Example 1 with the exception of beating the mixed pulp formulated for the surface layers up to Canadian standard freeness of 500 mL CSF.

Example 4

A water dispersible sheet was prepared in the same manner as in Example 1 with the exception of not installing the thermosensitive recording layer.

Example 5

A water dispersible sheet was prepared in the same manner as in Example 1 with the exception of using a mixed pulp consisting of 70% by weight of softwood bleached kraft pulp ($\alpha$-cellulose content is 85.6% by weight) as a wood pulp and 30% by weight of hardwood dissolving pulp ($\alpha$-cellulose content is 98.3% by weight) as wood pulps, instead of the mixed pulp used for the surface layers.

Example 6

A water dispersible sheet was prepared in the same manner as in Example 1 with the exception of not installing the second surface layer.

Example 7

A water dispersible sheet was prepared in the same manner as in Example 1 with the exception of not installing the second surface layer nor the thermosensitive recording layer.

Example 8

A water dispersible sheet was prepared in the same manner as in Example 2 with the exception of not installing the second surface layer nor the thermosensitive recording layer and not applied with the size press coating.

Example 9

A water dispersible sheet was prepared in the same manner as in Example 2 with the exception of not installing the thermosensitive recording layer and not applied with the size press coating.

Example 10

A water dispersible sheet was prepared in the same manner as in Example 2 with the exception of laminating the inner layer and the surface layers in a weight ratio of a surface layer:an inner layer:a surface layer=1:2:1.

Example 11

A water dispersible sheet was prepared in the same manner as in Example 1 with the exception of using an aqueous solution (pH 7.3) containing an enzyme-modified dextrin (manufactured by Sanwa Starch Co., Ltd., 2 weight % aqueous solution having a viscosity of 2 mPa·s at 20 degree C.), instead of the aqueous solution containing carboxymethyl cellulose sodium salt.

Example 12

A water dispersible sheet was prepared in the same manner as in Example 1 with the exception of using an aqueous solution (pH 7.4) containing a roasted dextrin (manufactured by Nippon Starch Chemical Co., Ltd., 2 weight % aqueous solution having a viscosity of 2 mPa-s at 20 degree C.), instead of the aqueous solution containing carboxymethyl cellulose sodium salt.

Comparative Example 1

A water dispersible sheet was prepared in the same manner as in Example 1 with the exception of beating the mixed pulp formulated for the surface layers up to Canadian standard freeness of 650 mL CSF.

Comparative Example 2

A water dispersible sheet was prepared in the same manner as in Example 1 with the exception of beating the mixed pulp formulated for the surface layers up to Canadian standard freeness of 400 mL CSF.

Comparative Example 3

A water dispersible sheet was prepared in the same manner as in Example 1 with the exception of using a mixed pulp consisting of 8.6% by weight of softwood bleached kraft pulp (α-cellulose content is 85.6% by weight) and 31.4% by weight of hardwood bleached kraft pulp (α-cellulose content is 86.0% by weight) as wood pulps and 60% by weight of hardwood dissolving pulp (α-cellulose content is 98.3% by weight) as a refined pulp, instead of the mixed pulp used for the surface layers.

Comparative Example 4

A water dispersible sheet was prepared in the same manner as in Example 1 with the exception of using a mixed pulp consisting of 21.4% by weight of softwood bleached kraft pulp (α-cellulose content is 85.6% by weight) and 78.6% by weight of hardwood bleached kraft pulp (α-cellulose content is 86.0% by weight) as wood pulps without containing the refined pulp, instead of the mixed pulp used for the surface layers.

Comparative Example 5

A water dispersible sheet was prepared in the same manner as in Example 1 with the exception of using a mixed pulp consisting of 40% by weight of softwood bleached kraft pulp (α-cellulose content is 85.6% by weight) as a wood pulp and 60% by weight of hardwood dissolving pulp (α-cellulose content is 98.3% by weight) as a refined pulp, instead of the mixed pulp used for the inner layer.

A water-dispersible sheet was not obtained, because the surface layer and the inner layer peeled off during the size press process. It is considered that then the binding strength between fibers became weak as the blending amount of the refined pulp in the inner layer increased.

Comparative Example 6

A water dispersible sheet was prepared in the same manner as in Example 1 with the exception of using solely a softwood bleached kraft pulp (α-cellulose content is 85.6% by weight) as a wood pulp without containing the refined pulp, instead of the mixed pulp used for the inner layer.

Comparative Example 7

A water dispersible sheet was prepared in the same manner as in Example 1 with the exception of preparing a single-layer sheet by only the papermaking raw material for the surface layer without installing the inner layer, then installing the tacky adhesive layers and the thermosensitive recording layer directly on each side of the surface layer.

Comparative Example 8

A water dispersible sheet was prepared in the same manner as in Example 1 with the exception of preparing a single-layer sheet by only the papermaking raw material for the inner layer without installing the surface layer, then installing the tacky adhesive layers and the thermosensitive recording layer directly on each side of the inner layer.

The prepared water-dispersible sheets were evaluated as follows at 14 days after applying tacky adhesive. The tacky adhesion over time was also evaluated on the first day after application of the adhesive. When evaluating the water dispersibility, the release paper was removed before the evaluation.

1) Water Dispersibility

Five test pieces of 3 cm square were prepared from each of the water-dispersible sheet, which was stored at room temperature (23 degree C., 50% RH) for 24 hours. Then, one piece of the above test piece was put into a 300 ml beaker with deionized water while stirring at 650 rpm with a stirrer. The time required for the test piece to break into two or more to form a floc and the time required for the test piece to become completely unraveled into each fiber to be fibrous were determined with a stopwatch. Then the average value of five measurements was taken as the water dispersion time (sec). The shorter the water dispersion time, the better the water dispersibility. The water dispersibility can be judged good if the water dispersion time (the time required for the test piece to break into two or more to form a floc) is less than 9 seconds for the test piece without the thermosensitive recording layer or less than 10 seconds for the test piece with the thermosensitive recording layer, and the water dispersion time (the time required for the test piece to become completely unraveled into each fiber to be fibrous) is less than 150 seconds for the test piece with the thermosensitive recording layer.

2) Tacky Adhesion Over Time

According to Japanese Industrial Standard (JIS) Z0237, three test pieces of 25 mm×250 mm were cut out from each of the water-dispersible sheet, and the tacky adhesive surface of the test piece with the release paper peeled off was put on a stainless steel plate (100×150 mm), then a rubber roller weighing 3 kg was reciprocated twice on the test piece.

The stainless steel plate was clamped by the lower chuck of a tensile tester, while one end of the tacky adhesive test piece was folded 180° and clamped by the upper chuck of the tensile tester. Then a 180 degree peel test was conducted at a tensile speed of 300 mm/min to measure the tacky adhesion (g/25 mm). The tacky adhesion over time can be judged good, if the ratio of the tacky adhesive force on the 14th day to the tacky adhesive force on the first day is 60% or more.

The configuration of the water-dispersible sheet and the evaluation results are shown in Table 1.

TABLE 1

| | Paper substrate | | | | | | | | | |
|---|---|---|---|---|---|---|---|---|---|---|
| | First surface layer | | | Inner layer | | | Second surface layer | | | |
| | Wood pulp | Refined pulp | Freeness of the mixed pulp | Wood pulp | Refined pulp | Freeness of the mixed pulp | Wood pulp | Refined pulp | Freeness of the mixed pulp | Size press coating |
| Example1 | 70% | 30% | 500 | 70% | 30% | 675 | 70% | 30% | 500 | CMC-Na |
| Example2 | 70% | 30% | 600 | 70% | 30% | 675 | 70% | 30% | 600 | CMC-Na |
| Example3 | 70% | 30% | 450 | 70% | 30% | 675 | 70% | 30% | 450 | CMC-Na |
| Example4 | 70% | 30% | 500 | 70% | 30% | 675 | 70% | 30% | 500 | CMC-Na |
| Example5 | N70% * | 30% | 500 | 70% | 30% | 675 | N70% | 30% | 500 | CMC-Na |
| Example6 | 70% | 30% | 500 | 70% | 30% | 675 | — | — | — | CMC-Na |
| Example7 | 70% | 30% | 500 | 70% | 30% | 675 | — | — | — | CMC-Na |
| Example8 | 70% | 30% | 600 | 50% | 50% | 675 | — | — | — | — |
| Example9 | 70% | 30% | 600 | 50% | 50% | 675 | 70% | 30% | 600 | — |
| Example10 | 70% | 30% | 500 | 70% | 30% | 675 | 70% | 30% | 500 | CMC-Na |
| Example11 | 70% | 30% | 500 | 70% | 30% | 675 | 70% | 30% | 500 | enzyme-modified dextrin |
| Example12 | 70% | 30% | 500 | 70% | 30% | 675 | 70% | 30% | 500 | roasted dextrin |
| Comparative Example1 | 70% | 30% | 650 | 70% | 30% | 675 | 70% | 30% | 650 | CMC-Na |
| Comparative Example2 | 70% | 30% | 400 | 70% | 30% | 675 | 70% | 30% | 400 | CMC-Na |
| Comparative Example3 | 40% | 60% | 500 | 70% | 30% | 675 | 40% | 60% | 500 | CMC-Na |
| Comparative Example4 | 100% | 0% | 500 | 70% | 30% | 675 | 100% | 0% | 500 | CMC-Na |
| Comparative Example5 | 70% | 30% | 500 | 40% | 60% | 675 | 70% | 30% | 500 | CMC-Na |
| Comparative Example6 | 70% | 30% | 500 | 100% | 0% | 675 | 70% | 30% | 500 | CMC-Na |
| Comparative Example7 | 70% | 30% | 500 | — | — | — | 70% | 30% | 500 | CMC-Na |
| Comparative Example8 | — | — | — | 70% | 30% | 675 | — | — | — | CMC-Na |

| | Evaluation of water-dispersible sheets | | | | | |
|---|---|---|---|---|---|---|
| | Thermo-sensitive recording layer | Water dispersibility (sec) | | Tacky adhesion (g/25 mm) | | |
| | | to form floc | to be fibrous | first day | 14th day | Ratio (%) (14th day/first day) |
| Example1 | installed | 8.1 | 64 | 1,069 | 828 | 77 |
| Example2 | installed | 8.4 | 48 | 1,084 | 711 | 66 |
| Example3 | installed | 8.8 | 112 | 1,078 | 815 | 76 |
| Example4 | — | 2.0 | 16 | 1,069 | 828 | 77 |
| Example5 | installed | 8.9 | 89 | 968 | 671 | 69 |
| Example6 | installed | 6.1 | 51 | 1,050 | 793 | 76 |
| Example7 | — | 4.3 | 19 | 1,092 | 814 | 75 |
| Example8 | — | 7.9 | 87 | 1,094 | 689 | 63 |
| Example9 | — | 8.4 | 101 | 1,052 | 651 | 62 |
| Example10 | installed | 8.5 | 104 | 1,166 | 1,055 | 90 |
| Example11 | installed | 9.1 | 138 | 1,051 | 801 | 76 |
| Example12 | installed | 9.3 | 141 | 1,034 | 780 | 75 |
| Comparative Example1 | installed | 6.6 | 40 | 1,123 | 647 | 58 |
| Comparative Example2 | installed | 10.0 | >300 | 1,049 | 862 | 82 |
| Comparative Example3 | installed | 8.2 | 48 | 951 | 430 | 45 |
| Comparative Example4 | installed | 10.0 | >300 | 1,238 | 1,080 | 87 |
| Comparative Example5 | installed | — | — | — | — | — |
| Comparative Example6 | installed | 14.0 | 250 | 1,119 | 992 | 89 |
| Comparative Example7 | installed | 17.3 | >300 | 1,166 | 1,055 | 90 |
| Comparative Example8 | installed | 4.0 | 51 | 1,007 | 500 | 50 |

* N in the table means that the wood pulp contains only softwood bleached kraft pulp.

It is understood from Table 1 that the water-dispersible sheet of the present invention has a suppressed time degradation of the tacky adhesiveness of the tacky adhesive layer, while maintaining the water dispersibility.

What is claimed is:

1. A water-dispersible sheet comprising a paper substrate comprising an inner layer and two surface layers, a first surface layer and a second surface layer, wherein the first surface layer is on one side of the inner layer and the second surface layer is on a side of the inner layer opposite to the first surface layer, wherein a tacky adhesive layer is installed on the first surface layer on a side opposite to the inner layer, wherein the first surface layer comprises a mixed pulp 1, which comprises a wood pulp and a refined pulp with α-cellulose content of 88% by weight or more, wherein the Canadian standard freeness of the mixed pulp 1 is from 450 to 600 ml CSF, the content of the wood pulp in the mixed pulp 1 is from 50 to 95% by weight, the inner layer comprises a mixed pulp 3, which comprises a wood pulp and a refined pulp with α-cellulose content of 88% by weight or more, wherein the Canadian standard freeness of the mixed pulp 3 is from 600 to 750 ml CSF, and the content of the wood pulp in the mixed pulp 3 is from 50 to 95% by weight; and the second surface layer comprises a mixed pulp 2, which comprises a wood pulp and a refined pulp with α-cellulose content of 88% by weight or more, wherein the Canadian standard freeness of the mixed pulp 2 is from 450 to 600 ml CSF.

2. The water-dispersible sheet of claim 1, wherein the Canadian standard freeness of the mixed pulp 1 in the first surface layer is 500 to 575 ml CSF.

3. The water-dispersible sheet of claim 1, wherein the content of the wood pulp in the mixed pulp 2 in the second surface layer is from 50 to 95% by weight.

4. The water-dispersible sheet of claim 3, further comprising a thermosensitive recording layer on the second surface layer.

5. The water-dispersible sheet of claim 1, further comprising a thermosensitive recording layer on the second surface layer.

6. The water-dispersible sheet of claim 1, wherein an aqueous coating material is applied on the second surface layer.

7. The water-dispersible sheet of claim 1, wherein the compositions of the first surface layer and the composition of the second surface layer are the same.

8. The water-dispersible sheet of claim 1, wherein each of the mixed pulps 1-3 does not contain regenerated cellulose fiber, fibrous carboxymethyl cellulose or fibrous carboxymethyl cellulose salt.

9. The water-dispersible sheet of claim 1, wherein the surface pH of the first surface layer is 6 to 8.

10. A paper substrate comprising an inner layer and two surface layers, wherein one of the two surface layers is installed on one side of the inner layer and another of the two surface layers is installed on an opposite side of the inner layer, wherein each of the two surface layers independently comprises a mixed pulp, which comprises a wood pulp and a refined pulp with α-cellulose content of 88% by weight or more, wherein the Canadian standard freeness of the mixed pulp is from 450 to 600 ml CSF, the content of the wood pulp in the mixed pulp is from 50 to 95% by weight, the inner layer comprises a mixed pulp 3, which comprises a wood pulp and a refined pulp with α-cellulose content of 88% by weight or more, wherein the Canadian standard freeness of the mixed pulp 3 is from 600 to 750 ml CSF, and the content of the wood pulp in the mixed pulp 3 is from 50 to 95% by weight.

11. The paper substrate of claim 10, wherein the Canadian standard freeness of the mixed pulp contained in at least one of the two surface layers is from 500 to 575 ml CSF.

12. The paper substrate of claim 10, further comprising a thermosensitive recording layer on either surface of the two surface layers.

13. The paper substrate of claim 10, wherein the compositions of the two surface layers are the same.

14. A method for preparing a water-dispersible sheet comprising steps (1) and (2):

(1) providing a paper substrate comprising an inner layer and two surface layers, a first surface layer and a second surface layer, wherein the first surface layer is installed on one side of the inner layer and the second surface layer is installed on an opposite side of the inner layer, wherein each of the two surface layers independently comprises a mixed pulp, which comprises a wood pulp and a refined pulp with α-cellulose content of 88% by weight or more, wherein the Canadian standard freeness of the mixed pulp is from 450 to 600 ml CSF, the content of the wood pulp in the mixed pulp is from 50 to 95% by weight, the inner layer comprises a mixed pulp 3, which comprises a wood pulp and a refined pulp with α-cellulose content of 88% by weight or more, wherein the Canadian standard freeness of the mixed pulp 3 is from 600 to 750 ml CSF, and the content of the wood pulp in the mixed pulp 3 is from 50 to 95% by weight, and (2) installing a tacky adhesive layer on the first surface layer.

15. A method of claim 14, further comprising (3) applying an aqueous coating material on the second surface layer between the steps (1) and (2).

16. A method of claim 14, further comprising (3) installing a thermosensitive recording layer on the second surface layer between the steps (1) and (2).

17. The method of claim 14, wherein the Canadian standard freeness of the mixed pulp contained in at least one of the first surface layer and the second surface layer is from 500 to 575 ml CSF.

18. The method of claim 14, wherein the compositions of the first surface layer and the second surface layer are the same.

* * * * *